United States Patent
Blasinski

(10) Patent No.: US 10,112,604 B2
(45) Date of Patent: Oct. 30, 2018

(54) METHOD FOR OPERATING A MOTOR VEHICLE AND CORRESPONDING MOTOR VEHICLE

(71) Applicant: AUDI AG, Ingolstadt (DE)

(72) Inventor: Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/524,902

(22) PCT Filed: Oct. 31, 2015

(86) PCT No.: PCT/EP2015/002189
§ 371 (c)(1),
(2) Date: May 5, 2017

(87) PCT Pub. No.: WO2016/070983
PCT Pub. Date: May 12, 2016

(65) Prior Publication Data
US 2017/0334435 A1    Nov. 23, 2017

(30) Foreign Application Priority Data
Nov. 6, 2014 (DE) .................. 10 2014 016 420

(51) Int. Cl.
*B60W 20/12* (2016.01)
*B60W 20/16* (2016.01)
(Continued)

(52) U.S. Cl.
CPC ............ *B60W 20/40* (2013.01); *B60W 10/06* (2013.01); *B60W 10/08* (2013.01); *B60W 20/12* (2016.01);
(Continued)

(58) Field of Classification Search
CPC ...... B60W 20/00; B60W 20/40; B60W 20/12; B60W 20/18; F01N 3/00; F01N 3/023; F01N 9/00; F01N 9/002
See application file for complete search history.

(56) References Cited

U.S. PATENT DOCUMENTS

| | | | |
|---|---|---|---|
| 8,676,423 B2 | 3/2014 | Blasinski et al. | |
| 9,371,766 B2 * | 6/2016 | Wang | F01N 9/007 |
| 9,382,827 B2 * | 7/2016 | Severin | F01N 3/0871 |
| 2012/0186228 A1 * | 7/2012 | Yacoub | F01N 3/031 |
| | | | 60/274 |
| 2013/0211642 A1 | 8/2013 | Blasinski et al. | |
| 2014/0074386 A1 | 3/2014 | McGee et al. | |
| 2014/0081563 A1 | 3/2014 | Wang et al. | |

(Continued)

FOREIGN PATENT DOCUMENTS

| | | |
|---|---|---|
| DE | 10 2008 025 569 A1 | 12/2009 |
| DE | 10 2011 014 164 A1 | 12/2011 |

(Continued)

OTHER PUBLICATIONS

International Search Report issued by the European Patent Office in International Application PCT/EP2015/002189 dated Jan. 25, 2016.

*Primary Examiner* — Yonel Beaulieu
(74) *Attorney, Agent, or Firm* — Henry M. Feiereisen LLC

(57) ABSTRACT

A method for operating a motor vehicle is disclosed. The motor vehicle is provided with a hybrid drive device having an electric machine, an internal combustion engine and a particle filter associated with the internal combustion engine, wherein the internal combustion engine is operated temporarily for regenerating the particle filter. In a first operating mode, the regeneration is only started when it is determined by a navigation device that an electric driving region to be driven through lies ahead, in which region an operation of the internal combustion engine and/or the regeneration of the particle filter is not desired.

11 Claims, 2 Drawing Sheets

(51) Int. Cl.
    *B60W 20/40*     (2016.01)
    *B60W 10/06*     (2006.01)
    *B60W 10/08*     (2006.01)
    *B60W 50/00*     (2006.01)
    *F01N 3/00*     (2006.01)
    *F01N 9/00*     (2006.01)
    *F01N 3/023*     (2006.01)

(52) U.S. Cl.
    CPC ........ B60W 20/16 (2016.01); B60W 50/0097 (2013.01); F01N 3/023 (2013.01); F01N 9/002 (2013.01); *B60W 2530/00* (2013.01); *B60W 2550/402* (2013.01); *B60W 2710/06* (2013.01); *B60Y 2300/476* (2013.01); *Y10S 903/905* (2013.01); *Y10S 903/906* (2013.01)

(56) References Cited

U.S. PATENT DOCUMENTS

| | | | |
|---|---|---|---|
| 2014/0083082 A1* | 3/2014 | Severin | F01N 3/0871 60/274 |
| 2015/0367719 A1 | 12/2015 | Blasinski et al. | |
| 2017/0334435 A1* | 11/2017 | Blasinski | B60W 20/40 |
| 2018/0094556 A1* | 4/2018 | Kurtz | F01N 3/0238 |

FOREIGN PATENT DOCUMENTS

| | | |
|---|---|---|
| DE | 10 2012 009 674 A1 | 9/2013 |
| DE | 10 2013 218 209 A1 | 3/2014 |

* cited by examiner

METHOD FOR OPERATING A MOTOR VEHICLE AND CORRESPONDING MOTOR VEHICLE

CROSS-REFERENCES TO RELATED APPLICATIONS

This application is the U.S. National Stage of International Application No. PCT/EP2015/002189, filed Oct. 31, 2015, which designated the United States and has been published as International Publication No. WO 2016/070983 and which claims the priority of German Patent Application, Serial No. 10 2014 016 420.9, filed Nov. 6, 2014, pursuant to 35 U.S.C. 119(a)-(d).

BACKGROUND OF THE INVENTION

The invention relates to a method for operating a motor vehicle, wherein the motor vehicle has a hybrid drive device which includes an electric machine, an internal combustion engine and a particle filter assigned to the internal combustion engine, the internal combustion engine being temporarily operable for regenerating the particulate filter. The invention further relates to a motor vehicle.

The hybrid drive device is associated with or forms a part of the motor vehicle. By means of the hybrid drive device, a torque which is directed to driving the motor vehicle can be provided. The hybrid device has a plurality of drive aggregates which are preferably configured differently. For example, the electric machine is provided as a first one of the drive aggregates and the internal combustion engine is provided as a second one of the drive aggregates. The plurality of drive aggregates are configured or operatively connectable so as to be able to generate the torque directed to driving the motor vehicle at least temporarily together. Thus it is for example possible to generate the torque only with the electric machine, only with the internal combustion engine or with the electric machine and the internal combustion engine together.

The particle filter is provided for cleaning exhaust gas generated by the internal combustion engine during its operation. With the particle filter, particles present in the exhaust gas, in particular soot particles, can be filtered out of the exhaust gas. These particles accumulate over time in the particle filter. When the internal combustion engine is designed as a diesel combustion engine, the particle filter can also be referred to as a diesel soot particle filter.

In order to remove the particles accumulating in the particle filter, it is necessary to regenerate the particle filter. Preferably, the particles are thereby combusted. For this purpose, the internal combustion engine is operated, for example, so that the temperature of the exhaust gas causes the particle filter or the particles present therein to strongly heat up, resulting in combustion of the particles. Correspondingly, regeneration of the particle filter requires operation of the internal combustion engine. In a motor vehicle with a hybrid drive device, however, a driver of the motor vehicle expects that significant portions of the drive are electric driving phases, i.e., time periods, in which the motor vehicle is driven solely by means of the electric machine.

SUMMARY OF THE INVENTION

It is an object of the invention to propose a method for operating a motor vehicle which has advantages over the prior art, and which in particular improves comfort for the driver of the motor vehicle.

This is achieved according to the invention by a method with the features of the independent method claim. Hereby it is provided that in a first operating mode the regeneration is initiated only when a navigation device determines that an electric driving region to be driven through is ahead in which an operation of the internal combustion engine and/or regeneration of the particle filter is not desired. For example, the navigation device determines a route of the motor vehicle along which the motor vehicle is likely to drive. Preferably, the route is determined based on a starting point or the current position of the motor vehicle on the one hand, and on the other hand by a destination point. The destination point can, for example, be predetermined by the driver of the motor vehicle or can be determined in advance by the navigation device. In the latter case, the navigation device determines the most likely route of the motor vehicle based on the starting point or the current position of the motor vehicle.

The navigation device for example divides the route or the expected route into different regions. In particular, one of these regions is an electric driving region. In this electric driving region, the operation of the internal combustion engine is not desired and/or not permitted, in particular due to the driver's expectations or legal regulations. The electric driving region may for example be in an urban area, in particular in a city center.

Another one of the regions can be a regeneration driving region. In the regeneration region, the operation of the internal combustion engine, and in particular the regeneration of the particle filter, are expressly permitted or even required. The regeneration driving region can, for example, be located on a highway, a federal highway or a country road. In particular, the regeneration driving region includes an anticipated route, which is sufficient to at least partially, in particular to the most degree, particularly preferably completely, regenerate the particle filter.

When the first operating mode is present, the regeneration of the particle filter is initiated only when the navigation device indicates that the region which is ahead on the driving route is an electric driving region and thus the internal combustion engine may not be operated in this region, or at least not for regenerating the particle filter. This means that the particle filter is already set for the drive through the electric driving region, so that the particle filter does not have to be regenerated on that part of the driving route that is situated in the electric driving region, for example because its filling level exceeds a threshold value. Rather, it is preferred to ensure that when entering the electric driving region the particle filter has a filling level, which allows driving through at least a part of the electric driving region, in particular the predominant part of the electric driving region, particularly preferably the entire electric driving region, without the particulate filter having to be regenerated.

A further embodiment of the invention provides that in the first operating mode the regeneration is initiated only when a filling level of the particle filter is greater than a first threshold value, wherein the first threshold value is a minimum filling level which corresponds to an empty particle filter. This condition is added to the condition described above. In the first operating mode, the regeneration is thus initiated only when the electric driving region to be driven through lies ahead and the filling level is greater than the first threshold value. The first threshold value is selected so that the regeneration of the particle filter is useful, i.e., the particle filter contains a certain number of combustible particles.

For example, the threshold value corresponds to the minimum filling level which corresponds to the empty particle filter. In this respect, the filling level has to be greater than the minimum filling level in order to be able to initiate regeneration. Preferably, the first threshold value can also be greater than the minimum filling level. With respect to a difference between a maximum filling level which corresponds to a completely filled particle filter and the minimum filling level, the first threshold value can be at least 10%, at least 20%, at least 30%, at least 40% or at least 50% above the minimum filling level. In the latter case, the first threshold value is precisely between the minimum filling level and the maximum filling level.

A further preferred embodiment of the invention provides that in the first operating mode the regeneration is initiated only when the filling level is greater than a second threshold value which is greater than the first threshold value. It is thus provided that the filling level of the particle filter has to be greater than described above. The second threshold value is, for example, at least 30%, at least 40%, at least 50%, at least 60%, at least 70% or at least 80% above the minimum filling level, again based on the difference between the minimum filling level and the maximum filling level. However, the second threshold value has to be greater than the first threshold value.

For example, whether the regeneration is initiated when the filling level of the particle filter is greater than the first threshold value or the second threshold value is determined based on an operating mode of the motor vehicle or the hybrid drive device. Thus the threshold value with which the filling level of the particle filter is compared, is selected from the first threshold value and the second threshold value depending on the operating mode. For example, the first threshold value is selected when the electric machine is operated as a generator in order to charge an energy storage with the current thus generated. On the other hand, the second threshold value can be selected, for example, when alternating between operation of the electric machine and the internal combustion engine, i.e., the motor vehicle is alternately driven solely with the electric machine and solely with the internal combustion engine.

A refinement of the invention provides that the regeneration is performed only in a regeneration driving region when the navigation device determines that the regeneration driving region will be driven through, in particular prior to the electric driving region. As already explained above, the navigation device can divide the driving route into different regions, at least the electric driving region and the regeneration driving region. In addition to these regions, however, further regions may be provided. The particle filter is not to be regenerated when the motor vehicle is currently located in the electric driving region and/or one of these further regions. Rather, regeneration is delayed until the motor vehicle is in the regeneration region. For this purpose, however, it is necessary for the regeneration driving region to be located on the driving route before the electric driving region, i.e., the motor vehicle is at least expected to drive through the regeneration driving region before driving through the electric driving region.

A further embodiment of the invention provides for the regeneration to be initiated when the internal combustion engine is operated so that it provides a drive torque which is greater than a predefined torque required for driving the motor vehicle. The predefined torque is for example predetermined by the driver of the motor vehicle and/or by a driver-assistant device. In the former case, the predefined torque is determined, for example, by means of a position of an operating pedal, in particular of an accelerator pedal. The drive torque actually set on the internal combustion engine, however, can be greater than this predefined torque, for example in order to drive the electric machine with the difference between the drive torque and the predefined torque, in particular when the electric machine is operated as a generator for generating electrical current. In this case, the regeneration can be initiated, in particular when the first operating mode is present.

A particularly preferred embodiment of the invention provides that an energy storage is charged by driving the electric machine with the internal combustion engine, wherein a differential torque between the drive torque and the predefined torque is applied to the electric machine. This embodiment has already been discussed above. The motor vehicle or the hybrid drive device has the energy storage, in particular a high-voltage energy storage, for operating the electric machine. As an alternative, the energy storage can, of course, also be designed as a low-voltage energy storage, which has a lower voltage than the high-voltage energy storage. The energy storage device is charged by means of the electric machine when the electric machine is operated as a generator. For this purpose, the electric machine is driven by the internal combustion engine.

In a further embodiment of the invention, it is provided that the energy storage is charged when the navigation device detects the electric driving region ahead. As already explained above, it may not be desired to operate the internal combustion in the electric driving region. Correspondingly, the motor vehicle is to be prepared to drive through the electric driving region at least partially, in particular largely, particularly preferably completely, solely by means of the electric machine, i.e., in particular without operating the internal combustion engine. In this case, for example, the state of charge of the energy storage device to be reached during charging can for example be determined based on the length of that part of the driving route which is located in the electric driving region.

In a further preferred embodiment of the invention, it is provided that, when the filling level of the particle filter exceeds a third threshold value, a change into a second operating mode is performed in which the regeneration is initiated immediately. In addition to the above-described first operating mode, the second operating mode is thus also present. The second operating mode is preferably a regeneration mode in which regeneration is performed immediately. For example, a change into the second operating mode, in particular from the first operating mode, is performed when the filling level of the particle filter exceeds the third threshold value. The third threshold value is in particular greater than the first threshold value and/or the second threshold value. For example, the third threshold value—again with respect to the difference between the minimum filling level and the maximum filling level—is at least 50%, at least 60%, at least 70%, at least 80%, at least 90% or at least 95% above the minimum level. When the third threshold value is exceeded, a change into the second operating mode is immediately performed and the particle filter is regenerated in order to prevent particles from escaping the particle filter.

Finally, in a further embodiment of the invention it can be provided that a change into the first operating mode is performed when the filling level of the particle filter falls below a certain filling level. This relates in particular to the change from the second operating mode into the first operating mode. During the regeneration of the particle filter, the filling level of the particle filter decreases. When the determined filling level has fallen below the filling level of the particle filter, the regeneration can be terminated and a change from the second operating mode into the first operating mode can be performed. The determined filling level can in principle be selected as desired. The determined filling level is, for example—with respect to the difference between the minimum filling level and the maximum filling level—at most 90%, at most 80%, at most 70%, at most 60%, at most 50%, at most 40%, at most 30%, at most 20%, at most 10%. However, the determined filling level can also correspond to the minimum filling level, the first threshold value, the second threshold value or the third threshold value.

The invention also relates to a motor vehicle, in particular for implementing the method described above, including a hybrid drive device which has an electric machine, an internal combustion engine and a particle filter assigned to the internal combustion engine, wherein the internal combustion engine is temporarily operable for regenerating the particulate filter. Hereby, it is provided that in a first operating mode the motor vehicle is configured to initiate regeneration only when a navigation device determines that an electric driving region to be driven through lies ahead in which the operation of the internal combustion engine and/or the regeneration of the particle filter is not desired. The advantages of such a design of the motor vehicle or of such an approach have been discussed above. Both the motor vehicle and the method can be further modified according to the description above, so that reference is made thereto.

BRIEF DESCRIPTION OF THE DRAWING

The invention is explained in more detail below with reference to the exemplary embodiments illustrated in the drawing, without limiting the invention. It is shown in FIG. 1 a motor vehicle on a driving route which has been divided into several regions, and FIG. 2 a flow diagram of the method for operating the motor vehicle of FIG. 1.

DETAILED DESCRIPTION OF PREFERRED EMBODIMENTS

Figure 1:
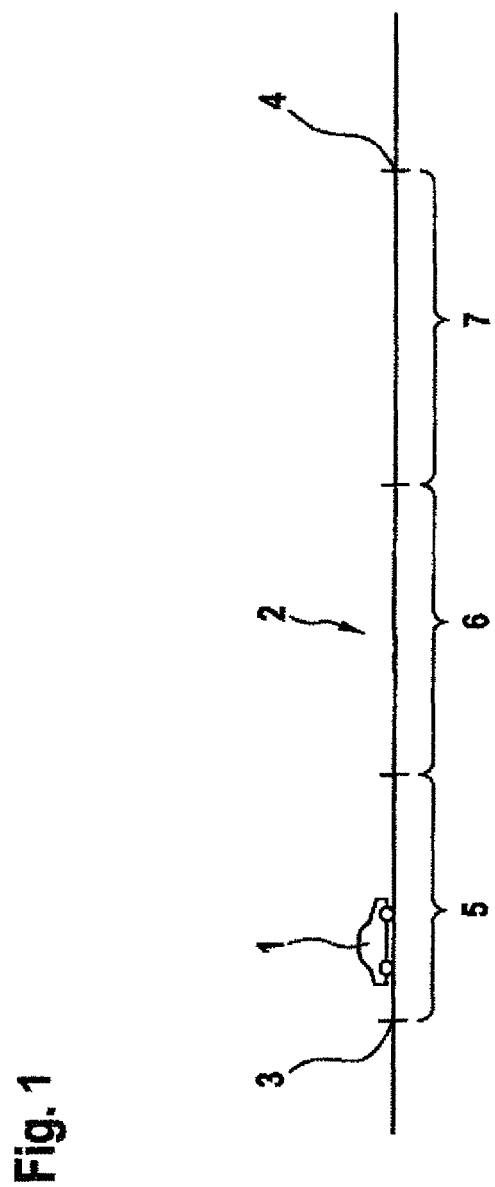
Figure 2:
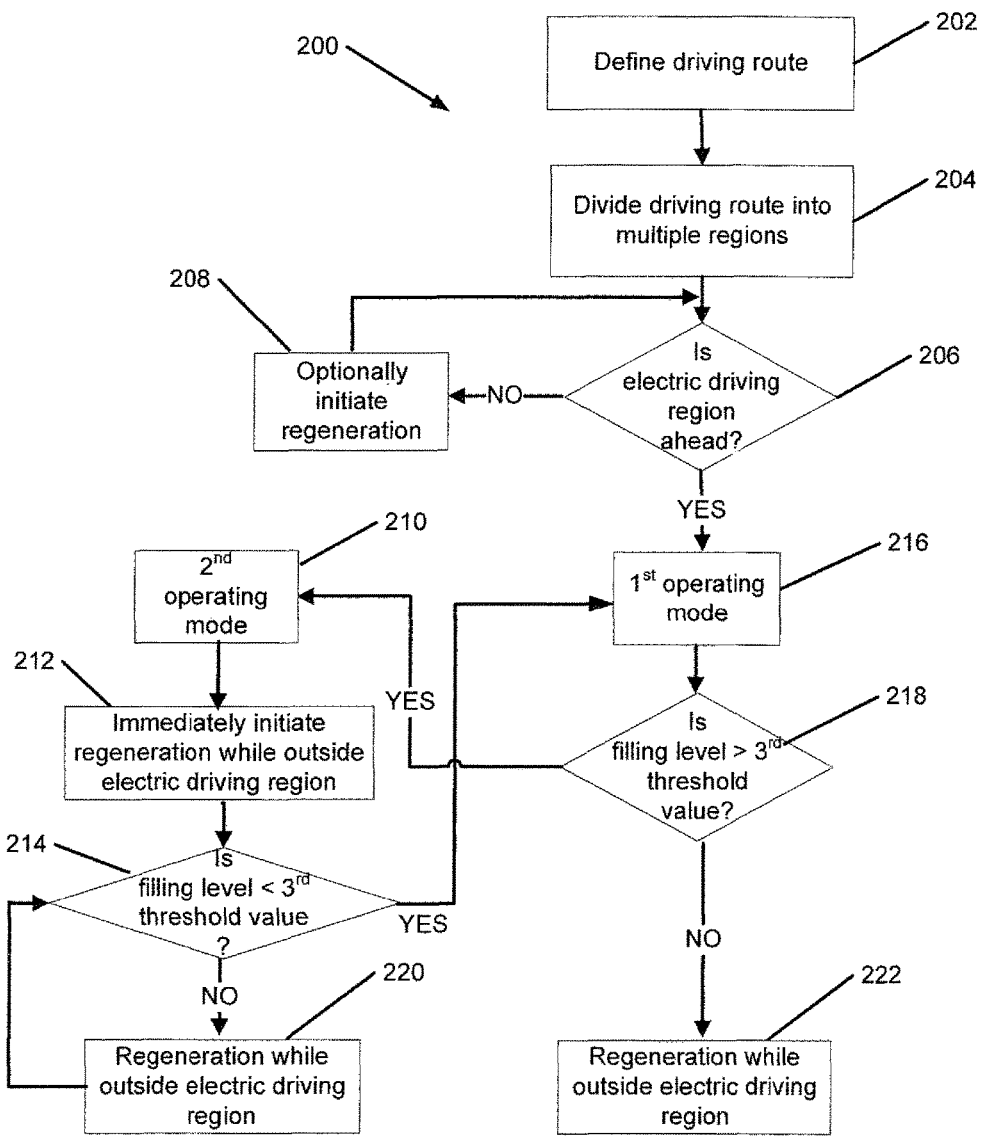

FIG. 1 shows a motor vehicle 1, which moves on a defined driving route 2, and FIG. 2 shows a flow diagram of a method 200 for operating the motor vehicle along the defined driving route. In this case, the driving route 2 starts, for example, from a starting point 3 and ends at a destination point 4. The driving route 2 is preferably determined, at step 202, by a navigation device (not shown) of the motor vehicle 1. For this purpose, the starting point 3 can correspond to the position of the motor vehicle 1 at the start of its operation, while the destination point 4 is or has been set by a driver of the motor vehicle 1. The navigation device now divides the driving route 2 into a plurality of regions 5, 6 and 7, at step 204.

The region 5 is, for example, a hybrid driving region, region 6 a regeneration region, and region 7 an electric driving region. This means that the motor vehicle is to be driven by hybrid drive in region 5, wherein the electric machine and the internal combustion engine are solely alternately used for driving the motor vehicle. The region 7 is provided as an electric driving region in which the motor vehicle is preferably to be driven solely by means of the electric machine. This means that an operation of the internal combustion engine or at least a regeneration of a particle filter associated with the internal combustion engine is not desired in region 7. On the other hand, region 6 is a regeneration region in which in particular the regeneration of the particle filter is permitted.

When the navigation device determines that the electric driving region 7 is ahead, at step 206, regeneration of the particle filter is initiated anticipatorily in a first operating mode, at step 216. If no electric driving region 7 is ahead, regeneration can optionally be performed without restrictions, at step 208. If it is determined while in the first operating mode that the filling level is above a third relatively high threshold value, at steps 218, the method transitions into a second operating mode, at step 210, and regeneration is initiated immediately, at step 212, while outside the electric driving region. When the filling level drops below the third threshold value during regeneration in the second operating mode, at step 214, the method transitions into the first operating mode at step 216. Otherwise, regeneration continues, at step 220, while still outside the electric driving region. It will be understood that the particle filter is not to be regenerated, i.e. regeneration is stopped, when the motor vehicle drives into or is located in the electric driving region. In particular, in the first operating mode, an energy storage is to be charged by means of the electric machine, which is then operated as a generator. For this purpose, the internal combustion engine generates a drive torque which is greater than a predefined torque, which is preferably determined by the driver of the motor vehicle and/or by a driver-assistant device. The difference between the drive torque and the predefined torque is used to drive the electric machine and to generate electrical current for charging the energy storage device. The energy storage is particularly preferably charged to such an extent that the motor vehicle 1 is able to drive through the electric driving region 7 at least partially, preferably largely or even completely, solely by means of the electric machine, which is operated with the electrical energy stored in the energy storage.

With such a procedure, an irritation of the driver due to an unexpected starting of the internal combustion engine and/or unexpected operating noises of the internal combustion engine is prevented. Accordingly, the driving comfort offered to the driver by the motor vehicle increases.

What is claimed is:

1. A method for operating a motor vehicle, said motor vehicle comprising a hybrid drive device having an electric machine, an internal combustion engine and a particle filter assigned to the electric machine, said method comprising:
   temporarily operating the combustion engine for regenerating the particle filter, wherein in a first operating mode the regenerating is only initiated when a navigation device determines that an electric driving region to be driven through by the motor vehicle lies ahead in which electric driving region an operation of the internal combustion engine and/or a regeneration of the particle filter is not desired.

2. The method of claim 1, wherein in the first operating mode the regenerating is only initiated when a filling level of the particle filter is greater than a first threshold value, wherein the first threshold value is a minimal filling level which corresponds to an empty particle filter.

3. The method of claim 2, wherein in the first operating mode the regenerating is only initiated when the filling level is greater than a second threshold value which is greater than the first threshold value.

4. The method of claim 1, wherein the regenerating is only performed in a regeneration driving region when the navigation device determines that the motor vehicle drives through the regeneration driving region.

5. The method of claim 4, wherein the regenerating is only performed in the regeneration driving region when the navigation device determines that the motor vehicle drives through the regeneration driving region before driving through the electric driving region.

6. The method of claim 1, wherein the regenerating is initiated when the internal combustion engine is operated so that the internal combustion engine provides a drive torque which is greater than a predefined drive torque requested for driving the motor vehicle.

7. The method of claim 6, further comprising charging an energy storage of the motor vehicle by driving the electric machine with the internal combustion engine, and applying a torque corresponding to a difference between the drive torque and the predefined torque to the electric machine.

8. The method of claim 7, wherein the energy storage is charged when the navigation device detects the electric driving region ahead.

9. The method of claim 1, further comprising changing into a second operating mode in which the regenerating is initiated immediately when the filling level of the particle filter exceeds a third threshold value.

10. The method of claim 1, further comprising changing into the first operating mode when the filling level of the particle filter falls below a defined filling level.

11. A motor vehicle, comprising:
a hybrid drive device, said hybrid drive device comprising an electric machine, an internal combustion engine and a particle filter assigned to the internal combustion engine, said internal combustion engine being temporarily operable for regenerating the particle filter, said motor vehicle being configured to initiate a regeneration of the particle filter in a first operating mode only when a navigation device determines that an electric driving region to be driven through by the motor vehicle lies ahead in which electric driving region an operation of the internal combustion engine and/or the regeneration of the particle filter is not desired.

\* \* \* \* \*